United States Patent
Buehrer et al.

(10) Patent No.: US 10,644,749 B2
(45) Date of Patent: *May 5, 2020

(54) CABLE TRACKING BY ELECTROMAGNETIC EMISSION

(71) Applicant: International Business Machines Corporation, Armonk, NY (US)

(72) Inventors: Petra Sabine Buehrer, Boeblingen (DE); Florian Graf, Zurich (CH); Thorsten Muehge, Budenheim (DE); Tim U. Scheideler, Schoenenberg (CH); Raphael Waltert, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,762

(22) Filed: Jun. 11, 2019

(65) Prior Publication Data

US 2019/0296793 A1    Sep. 26, 2019

Related U.S. Application Data

(63) Continuation of application No. 15/823,879, filed on Nov. 28, 2017, now Pat. No. 10,382,094.

(51) Int. Cl.
  *H04W 4/00* (2018.01)
  *H04W 4/02* (2018.01)
  (Continued)

(52) U.S. Cl.
  CPC .............. *H04B 3/462* (2013.01); *G01C 3/00* (2013.01); *G01S 11/00* (2013.01); *G01S 13/00* (2013.01);
  (Continued)

(58) Field of Classification Search
  CPC combination set(s) only.
  See application file for complete search history.

(56) References Cited

U.S. PATENT DOCUMENTS

| | | | |
|---|---|---|---|
| 6,295,019 B1 * | 9/2001 | Richards | G01S 13/08 342/118 |
| 6,731,908 B2 * | 5/2004 | Berliner | G01S 13/84 342/127 |

(Continued)

OTHER PUBLICATIONS

Office Action (dated Nov. 26, 2018) for U.S. Appl. No. 15/823,879, filed Nov. 28, 2017.

(Continued)

*Primary Examiner* — Linda Wong
(74) *Attorney, Agent, or Firm* — Schmeiser, Olsen & Watts, LLP; Mark Vallone (57) ABSTRACT

A method and system for tracking a course of a cable using electromagnetic waves. A first distance between a first transceiver and a second transceiver is determined by determining a total transmission time for a first wireless signal traveling in a linear line from the first transceiver to the second transceiver and back to the first transceiver in the linear line, wherein the first transceiver and the second transceiver each include a receiver and a transmitter. A second distance between the first transceiver and the second transceiver is determined by comparing a phase difference between the first signal received by the second transmitter and a second signal received by the second transmitter, wherein the second signal was transmitted from the first transceiver into the cable and received by the second transceiver wirelessly from the cable, and wherein the first signal and the second signal are phase aligned.

20 Claims, 7 Drawing Sheets

(51) Int. Cl.
*H04B 13/00* (2006.01)
*G01C 3/00* (2006.01)
*G01S 13/88* (2006.01)
*G01S 13/74* (2006.01)
*H04B 3/462* (2015.01)
*G01S 13/00* (2006.01)
*H04W 40/38* (2009.01)
*H04W 40/00* (2009.01)
*G01S 11/00* (2006.01)

(52) U.S. Cl.
CPC .............. *G01S 13/74* (2013.01); *G01S 13/88* (2013.01); *H04B 13/00* (2013.01); *H04W 4/00* (2013.01); *H04W 4/02* (2013.01); *H04W 4/023* (2013.01); *H04W 40/00* (2013.01); *H04W 40/38* (2013.01)

(56) References Cited

U.S. PATENT DOCUMENTS

| | | | |
|---|---|---|---|
| 8,314,620 | B2 | 11/2012 | Andarawais |
| 9,088,369 | B2 | 7/2015 | Poddar et al. |
| 10,190,862 | B2 | 1/2019 | Dai et al. |
| 2003/0195644 | A1 | 10/2003 | Borders et al. |
| 2004/0196177 | A1 | 10/2004 | Billington et al. |
| 2005/0213741 | A1 | 9/2005 | Sakurai et al. |
| 2007/0298814 | A1* | 12/2007 | Kim .................. H04W 64/00 455/456.1 |
| 2008/0129622 | A1 | 6/2008 | Freeland et al. |
| 2009/0109085 | A1* | 4/2009 | Needham ............ G01S 7/4017 342/174 |
| 2010/0183313 | A1* | 7/2010 | Rhodes ................ H04B 13/02 398/104 |
| 2010/0237961 | A1* | 9/2010 | Pai ...................... H05K 1/024 333/4 |
| 2011/0085537 | A1* | 4/2011 | Tsai .................... H04B 7/0619 370/342 |
| 2011/0134972 | A1 | 6/2011 | Zhu et al. |
| 2011/0148710 | A1* | 6/2011 | Smid .................. G01S 13/84 342/394 |
| 2011/0227585 | A1* | 9/2011 | Andarawis ............ H03D 13/00 324/601 |
| 2012/0242341 | A1 | 9/2012 | Olsson et al. |
| 2012/0249590 | A1 | 10/2012 | Maciocci et al. |
| 2012/0250728 | A1 | 10/2012 | Pischl et al. |
| 2013/0287155 | A1 | 10/2013 | Nakamizo et al. |
| 2013/0320983 | A1 | 12/2013 | Stephan |
| 2014/0002097 | A1 | 1/2014 | Yagi |
| 2014/0038636 | A1 | 2/2014 | Karr et al. |
| 2014/0327539 | A1 | 11/2014 | Cudak et al. |
| 2015/0195117 | A1 | 7/2015 | Pon et al. |
| 2015/0201308 | A1* | 7/2015 | Karr .................... G01S 13/825 455/456.2 |
| 2015/0256974 | A1* | 9/2015 | Zobenko ............. H04W 4/023 455/456.3 |
| 2016/0033254 | A1* | 2/2016 | Zeine .................. G01S 11/00 307/104 |
| 2016/0047879 | A1* | 2/2016 | Yoon .................. G01S 11/08 342/458 |
| 2016/0103197 | A1 | 4/2016 | Schultz et al. |
| 2016/0321902 | A1* | 11/2016 | Karr .................... G01S 13/825 |
| 2017/0038404 | A1* | 2/2017 | Wright .................. G01S 11/12 |
| 2017/0150316 | A1 | 5/2017 | George et al. |
| 2017/0234965 | A1* | 8/2017 | Taylor, Jr. ............. G01S 5/10 340/539.13 |
| 2017/0322294 | A1* | 11/2017 | Zohar .................. G01S 11/02 |

OTHER PUBLICATIONS

Amendment (dated Feb. 26, 2019) for U.S. Appl. No. 15/823,879, filed Nov. 28, 2017.

Notice of Allowance (dated Apr. 3, 2019) for U.S. Appl. No. 15/823,879, filed Nov. 28, 2017.

\* cited by examiner

CABLE TRACKING BY ELECTROMAGNETIC EMISSION

This application is a continuation application claiming priority to Ser. No. 15/823,879, filed Nov. 28, 2017, now U.S. Pat. No. 10,382,094, issued Aug. 13, 2019.

TECHNICAL FIELD

The invention relates generally to tracking a cable, and more specifically, to tracking a course of a cable using electromagnetic waves.

BACKGROUND

Modern data centers comprise at least three key components: servers, storage systems and networking components. All of these three key components require cables therebetween. Servers are connected to storage systems via cables, servers are connected to networking components via cables, storage systems are connected to network components via cables, storage systems are connected to other storage systems via cable, and so on. The number of computer and storage systems in a data center has grown significantly on average in previous years. At the same time, the cabling between all these three key components is growing over proportionally, not seldom exponentially. The reason why the cables are not really visible in typical data centers is that the cables are buried in a double floor. Especially in seasoned and data center it becomes more and more difficult to determine the exact route of a cable in the double floor, which becomes a serious problem if components and the data center may be removed and replaced and cables may be reused for other purposes.

But not only in data centers is the exact course of a data cable a problem. The problem also exists in professionally used buildings such as offices, factories, shops and shopping malls. Often poor or no documentation at all is produced during construction work. Any kind of maintenance (e.g., finding a damaged cable in large buildings or performing physical network changes in a data center) becomes tedious and error-prone.

One known method for tracking cables is to connect a radio transmitter to one point at the cable and measure the emitted radio signal from the cable with a dipole antenna. The radio signal is emitted perpendicularly to the running direction of the cable. A cable changing directions can be seen as a series of dipole antennas. However, such a setup does not provide information about a length of a cable, or where exactly the cable is broken. Additionally, trying to identify the course of a cable with the known method would consequently lead to errors, as will be described by FIG. 6.

SUMMARY

Embodiments of the present invention provide a method, and associated system and computer program product, for tracking a course of a cable using electromagnetic waves. A first transceiver sends to a second transceiver a first signal wirelessly in a linear line. The first transceiver and the second transceiver each comprise a receiver and a transmitter. The second transceiver sends back to the first transceiver the first signal in the linear line. A first distance between the first transceiver and the second transceiver is determined by determining a total transmission time for a first wireless signal travelling from the first transceiver to the second transceiver and back to the first transceiver. A second signal is transmitted from the first transceiver into the cable. The first signal and the second signal are phase aligned. The second transceiver receives the second signal wirelessly from the cable. A second distance between the first transceiver and the second transceiver is determined by comparing a phase difference between the first signal received by the second transmitter and the second signal received by the second transmitter.

BRIEF DESCRIPTION OF THE DRAWINGS

Embodiments of the present invention will be described, by way of example only, and with reference to the following drawings.

DETAILED DESCRIPTION

In the context of this description, the following definitions, conventions, terms and/or expressions are used The term 'course of a cable' denotes the exact position of a cable in a cable duct, a double floor, a double sealing or similarly hidden.

The term 'electromagnetic waves' denotes waves in the radiofrequency band allowing signal transportation over the air or through the cable. Typical frequencies may be in the range of 10 kHz into 100 MHz. Practical frequency ranges include 1 MHz to 100 MHz, and 3 MHz to 20 MHz.

The term 'transceiver' denotes a device comprising a sender and a receiver tunable to different radio frequencies.

The term 'linear line' denotes the shortest distance between two points, sometimes also denoted as line of sight, beeline, air line and/or the direct line. The linear line may not require that point B may be visible from point A. A site obstacle may be positioned between the two points. However, the linear line may go through the obstacle.

The term 'phase aligned' denotes that two signals, in particular radio frequency signals, do not have a phase difference. A phase shift denotes that two signals are not aligned in their respective phase. Based on the frequency of the radio signal, the time difference may be calculated from the phase difference. Such a time difference may be equivalent to a length given the propagation speed of radio signals which is the speed of light.

Figure 6:
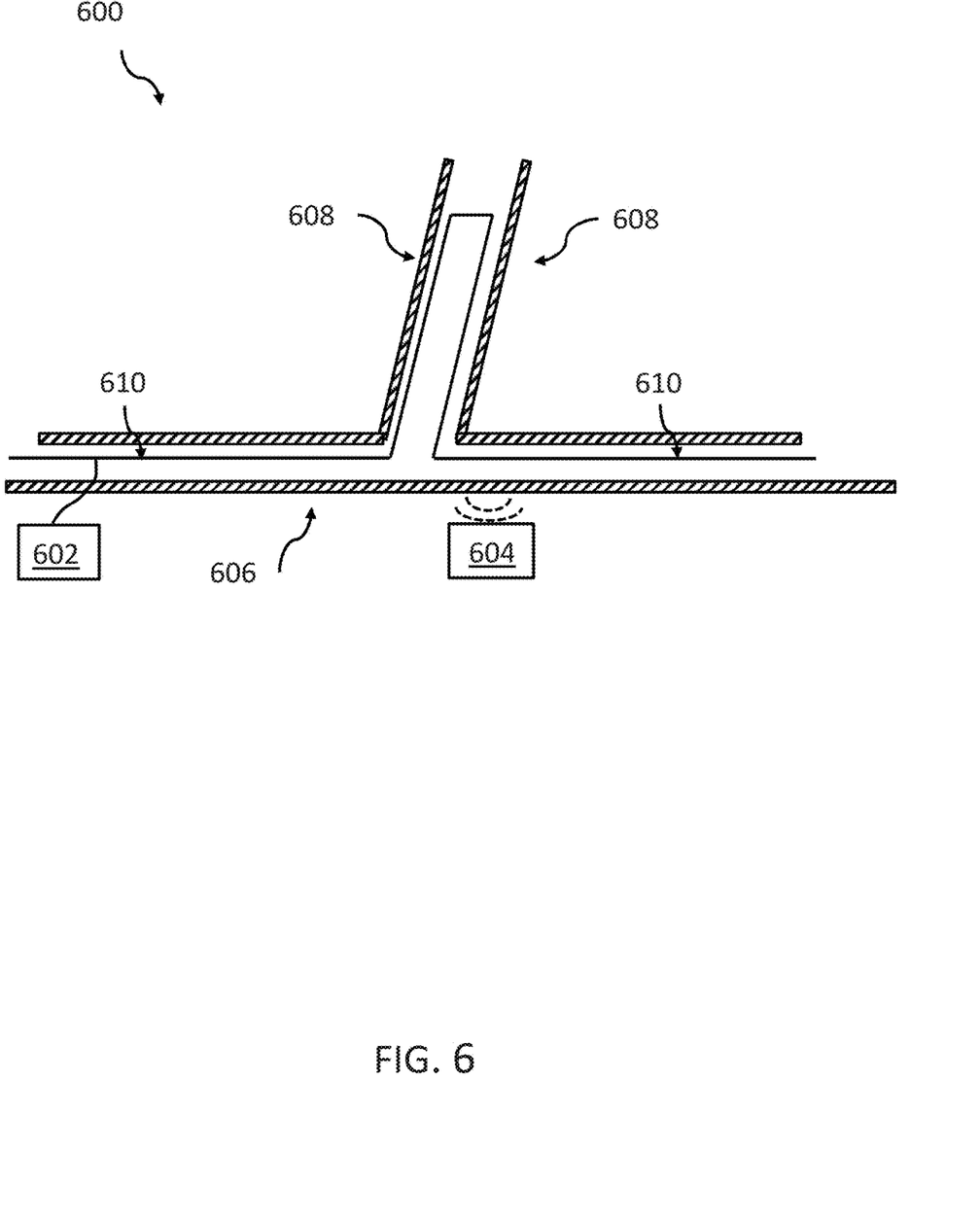
FIG. 6 shows an example in which a traditional cable tracking method may fail completely.

The inventive method for tracking a course of a cable using electromagnetic waves may offer multiple advantages and technical effects:

The inventive method overcomes the limitations of known methods, as described below (FIG. 6). The inventive method also copes with the loops and nooses of cables hidden behind walls. The inventive method is based on interferometry. One embodiment, however, may require that the two transceivers should communicate constantly via a radio signal to determine the distance to each other.

The length of the cable from the first transceiver to the second transceiver may be determined by the propagation time (i.e., signal running time of the signal propagating through the cable as compared to propagating through the air interface). Because the propagation time is in the range of nano-seconds, it is not possible that the two transceivers are synchronized only once before the measurement. Rather the two transceivers may be kept in sync continuously. Because this synchronization signal also runs with the speed of light, the distance between the two transceivers may be taken into the account as well.

Thus, the position of a rupture of the cable, as well as the cable length in comparison to a direct line may be determined. It may also not be required to put the cable in real operation; e.g., connected to a power net or another active connection between, e.g., servers or storage devices.

The inventive method is also suitable to identify places where the cable would run in a niche or be rolled-up on a cable drum. A user would take notice of this because an abrupt change of length would indicate a loop in the cable. It may also be possible to activate an optical or acoustical alarm signals in such a situation. The activation may be done of the change in length is above a predefined threshold value.

In the following, additional embodiments of the inventive method and related system will be discussed:

According to one embodiment of the inventive method, determining a first distance may be performed by comparing a phase shift between the sent first signal and the received first signal by the first transceiver. The phase shift may be combined with the speed of light to calculate a distance according to distance=$v_{LIGHT} * t_{DELTA\_PHASE}$.

According to one embodiment of the inventive method, determining a first distance may use a time delay caused by the second transceiver. This time delay may be determined before a real measurement; e.g., by placing the two transceivers side by side and measuring the phase difference which may be equivalent to the time delay within the second transceiver.

According to one embodiment of the inventive method, the second distance may equal the cable length from the first transceiver to the second transceiver. Knowing the linear distance, or beeline or direct distance or air line distance in a line of sight, between the first and second transceiver, may allow a determination of how much longer the cable may be compared to the direct distance between the two transceivers.

According to one embodiment of the inventive method, a distance between the second transceiver and the cable may be at least 100 times smaller than the distance between the first transceiver and the second transceiver. Thus, the second transceiver may be positioned closer to the cable than the first transceiver.

According to an additional embodiment of the present method, a frequency of the first signal and a frequency of the second signal are equal, which may allow for a better and easier comparison of phase shifts and a transformation in a time difference for determining a length difference between the first signal and the second signal.

According to one embodiment of the inventive method, a frequency of the first signal and the second signal are each unequal to a desired or specified signal on the cable. Hence, a frequency typically use the cable (e.g., 31.25 MHz in the case of Ethernet cables) may be excluded from the operating frequency of embodiments of the method and system of the present invention.

According to one embodiment of the inventive method, a frequency of the first signal and the second signal may each be in the range of 10 kHz to 100 MHz. The longer wavelength (i.e., 10 kHz to 1 MHz) may be more suitable for a determination of typical cable length. For shorter wavelengths (i.e., above 1 MHz), sine waves may not be used but coded signal bursts may be used, which may be seen as an alternative to the direct usage of sine waves as the first and second signal.

According to one further embodiment of the inventive method, the determined distance between the first transceiver and the second transceiver may be transmitted wirelessly from the first transceiver to the second transceiver, which may be instrumental for interpreting the time difference between the first and second signal at the second transceiver.

According to an embodiment inventive method, the first signal may pass through a solid barrier. For example, a wall may be positioned between the first and the second transceiver.

Figure 1:
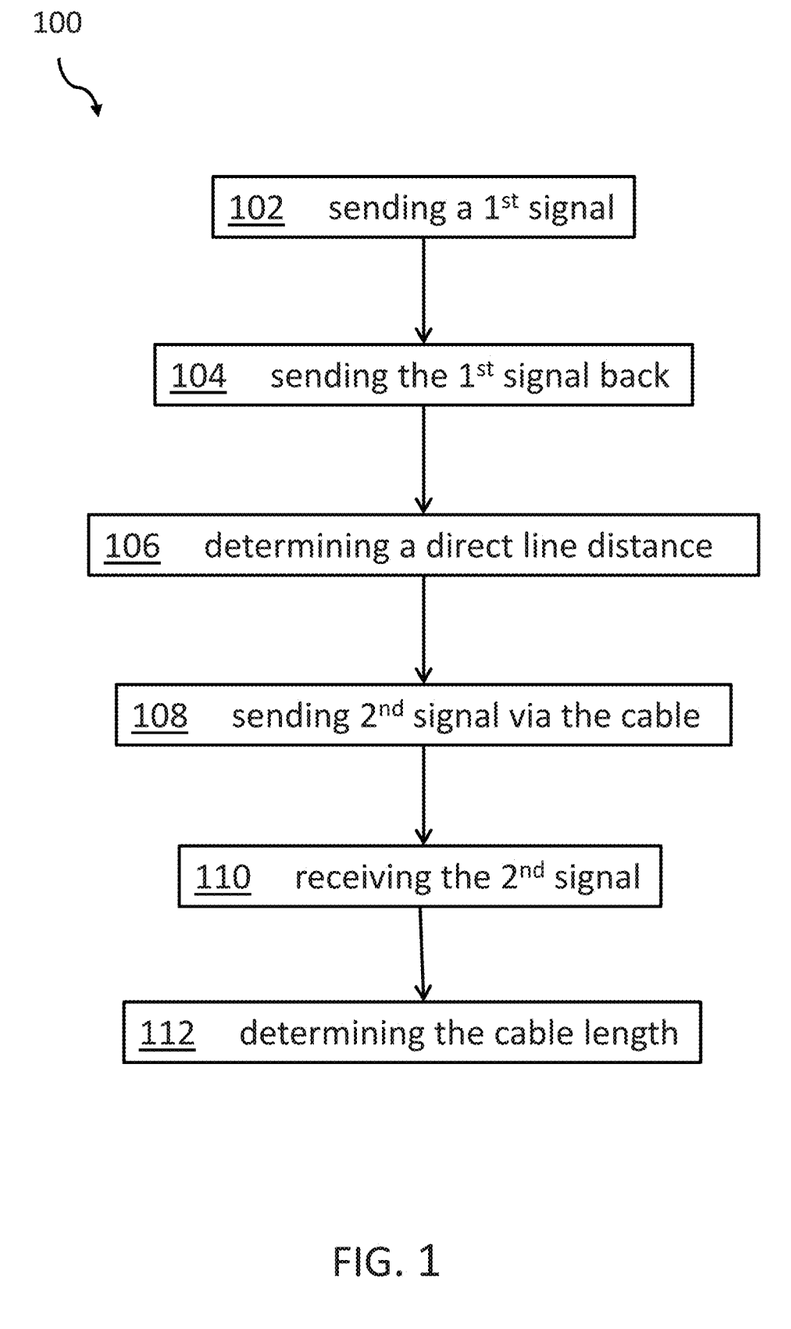
FIG. 1 shows a flow chart of an embodiment of a method for tracking a course of a cable using electromagnetic waves, in accordance with embodiments of the present invention.

FIG. 1 shows a flow chart of an embodiment of a method 100 for tracking a course of a cable using electromagnetic waves, in accordance with embodiments of the present invention. The method 100 comprises sending, in step 102, a first signal by a first transceiver (acting as a sender) to a second transceiver (acting as a receiver) wirelessly in a linear or direct line. The first transceiver and the second transceiver each comprise a receiver and a transmitter, tuned to the same frequency.

The method 100 also comprises sending, in step 104, the first signal by the second transceiver (acting as a sender) back to the first transceiver (acting as a receiver)—in the linear line, i.e., on the same way back. Thus, the sending in step 102 and the sending in step 104 of the first signal require identical transmission times.

Furthermore, the method 100 comprises also determining, in step 106, a first distance between the first transceiver and the second transceiver by determining a total transmission time (time of flight) for a first wireless signal travelling from the first transceiver to the second transceiver and back to the first transceiver. The first distance determination can be performed by a measurement of the phase difference between the sent and received signal by the first transceiver. Additionally, also the delay within the second transceiver may be taken into account.

Additionally, the method 100 comprises transmitting, in step 108, a second signal from the first transceiver into the cable, wherein the first signal and the second signal are phase aligned. Thus, the first signal and the second signal are being sent at the same time. There may be a direct electrical connection of the transceiver to the cable.

Moreover, the method 100 comprises receiving, in step 110, the second signal by second transceiver wirelessly from the cable, which is achieved by receiving the transmitted second signal from the cable from which the second signal is radiated.

The method 100 comprises determining, in step 112, a second distance, which is equal to the length of the cable between the first transceiver and the second transceiver, by comparing a phase difference between the first signal received by the second transmitter and the second signal received by the second transmitter. For this determination of the second distance, it is useful that the direct line distance between the first transceiver and the second receiver is "known" by the second transceiver. Thus in one embodiment, the determined distance by the first transceiver can be transmitted wirelessly from the first transceiver to the second receiver on a second common occasion channel.

Figure 2:
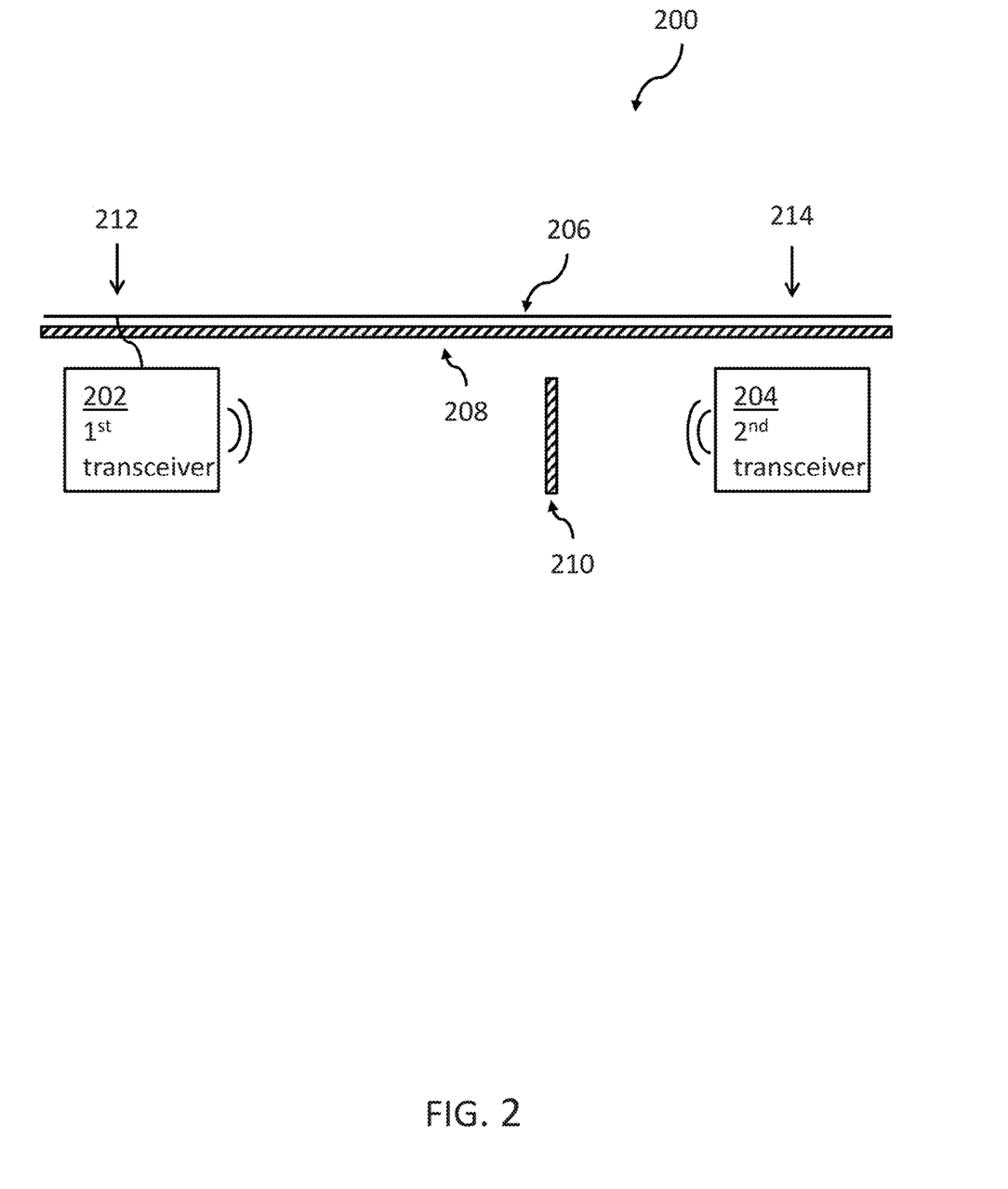
FIG. 2 shows an overview diagram of a first transceiver, a second transceiver and a cable, in accordance with embodiments of the present invention.

FIG. 2 shows an overview diagram 200 of a first transceiver 202, a second transceiver 204, and a cable 206, in accordance with embodiments of the present invention. Between the two transceivers 202, 204, a wall 210 may be positioned so that no direct optical line of sight can be established between the first transceiver 202 and the second transceiver 204. Also shown is another 208 between the cable 206 and the transceivers 202 and 204. The cable 206 may (e.g., in a data center) lie in a double floor or in a cable duct. The first transceiver 202 may also be connected via a short cable connection to the cable 206.

The cable 206 may be a traditional copper cable with one or more wires and/or a shooting. However, the inventive method can also be applied to optical fiber cables when the optical fiber cables are equipped for the purpose of tracking with a thin copper cable attached to the surface of the shielding or integrated into the shielding. The cable 206 to be tracked acts as an antenna, such that the signal on the cable 206 is receivable by the second transceiver 204. Thus, the second transceiver 204 may comprise a dipole antenna which may be placed relatively near the cable 206.

Figure 3:
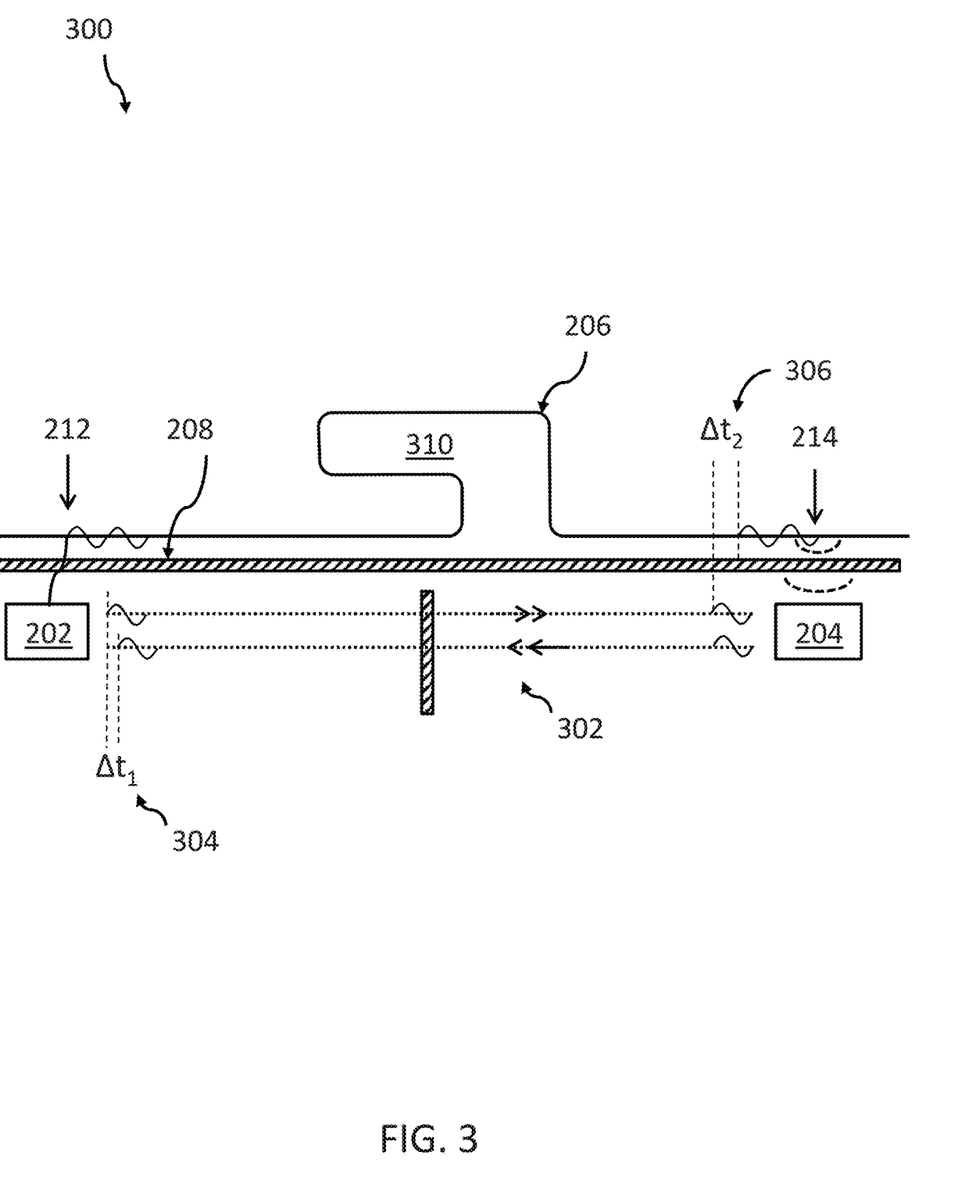
FIG. 3 shows elements of a configuration for implementing a method, in accordance with embodiments of the present invention.

FIG. 3 shows elements of a configuration 300 for implementing a method 300, in accordance with embodiments of the present invention. The transceiver 202 sends a radio signal to the second transceiver 204. The second receiver 204 sends the signal immediately back to the first transceiver 202. The arrows 302 indicate the direction of the signals. In one embodiment, it is assumed that the transceiver 204 does not cause any internal time delay between receiving and sending the signals.

In the transceiver 204, the time difference $\Delta t_1$ 304 between the sent signal and the received signal is measured and based on $\Delta t_1$. The linear distance or direct distance or shortest distance between the first transceiver 202 and the second transceiver 204 is determined according to the formula distance=$c/(2*\Delta t_1)$, wherein c is the speed of light.

Using a second channel or by modulating the first signal, the determined direct linear distance between the first transceiver 202 and the second transceiver 204 can be transmitted to the second transceiver 204.

If the second transceiver 204 causes a delay between the received first signal and sending the second signal, this delay is taken into account when calculating the distance.

The cable 206 may comprise a larger loop 310 which makes the cable between the position 212 of the first transceiver and the position 214 of the second transceiver longer (actually much longer in one embodiment) than the direct distance between the two transceivers 202, 204.

In order to determine the real length of the cable between the two positions 212 and 214, a phase aligned (with a first signal) second signal is inserted into the cable 206. The second transceiver 204 can receive the second signal radiated from the cable at the position 214 and compare the second signal with the wirelessly received first signal. Based on the determined phase shift $\Delta t_2$ 306, a difference between the direct linear distance between the two transceivers 202, 204 and the cable length can be determined based on the known direct linear distance between the two transceivers 202, 204.

In order to get a correct result, the frequency must be tuned correctly as the method cannot distinguish between a phase shift $\Phi$ and a phase shift ($\Phi+2\pi$). To avoid this incorrect tuning, the frequency can be constantly tuned in such a way that the phase shift $\Phi$ remains constant; e.g., $\pi/10$. The radio transmitter 202 starts with a reasonable low-frequency (e.g., 3 MHz) which approximates a wavelength of 100 m, and gradually increases the frequency until the desired phase shift $\Phi$ is measured between the two transceivers 202, 204. The more the path of cable deviates from the air distance between the transceivers 202, 204, the smaller $\Phi$ is and hence, the larger the wavelengths must be selected.

Figure 4:
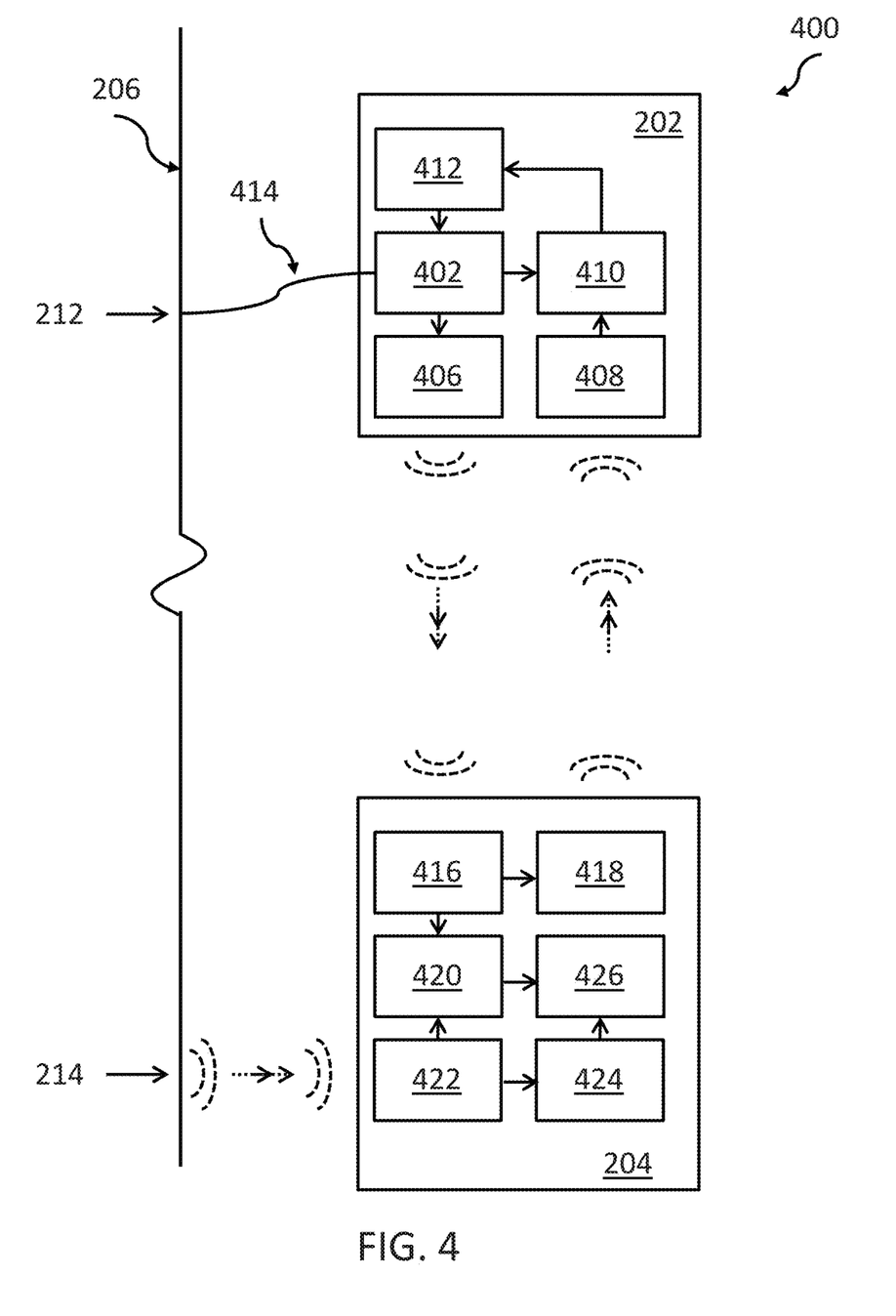
FIG. 4 shows a system comprising the first transceiver and the second transceiver with subcomponents, in accordance with embodiments of the present invention.

FIG. 4 shows a system 400 comprising the first transceiver 202 and the second transceiver 204 with subcomponents, in accordance with embodiments of the present invention A radio wave (RF) generator 402 is connected to the cable 206 via connection 414. The RF generator 402 is connected to a transmitting aerial 406 for transmitting the first signal wirelessly to the second transceiver 204.

The transceiver 204 may comprise a dipole antenna (not shown) connected to the radio amplifier 422. In one embodiment of an implementation, the dipole antenna can be implemented as a motorized rotating antenna through the full solid angle to determine the running direction of the cable 206.

An intensity meter 424 (e.g., a voltmeter) measures the signal strengths and turns the measured signal strengths into a numerical value and sends the data (i.e., the measured signal strengths and/or numerical value) to the interface display unit 426.

A solid angle meter (protractor) (not shown in FIG. 4) measures the angle of the dipole antenna in 3-D space.

The transmitting aerial 406 sends the same signal (as fed into the cable 206 to be tracked) to the receiving aerial 416 of the transceiver 204. The transmitting aerial 418 relays the signal back to the receiving aerial 408. The phase shift meter 410 determines the phase shift corresponding to $\Delta t_1$ between the original first signal from the radio waves generator 402 and the retransmitted signal from the receiving aerial 408.

The frequency adjuster 412 adjusts the frequency (when necessary; e.g., when the transmitter 204 has been moved) to keep the phase shift, resulting from the direct linear distance of the two transceivers 202 and 204 at a predetermined value.

The RF generator 402 adopts the frequency from the frequency adjuster 412 and modulates information about the phase shift (i.e., a value of the distance between the two transceivers 202, 204) on top of the first signal transmitted by the transmitting aerial 406.

The phase shift meter 420 measures the phase shift corresponding to $\Delta t2$ between the signal received by the receiving aerial 416 and by the radio amplifier 422. The phase shift meter 420 receives the numerical value of the phase shift corresponding to $\Delta t_1$ from the receiving aerial 416. The total phase shift corresponding to $\Delta t_1$ is sent to the interface display unit 426. The interface display unit 426 determines the cable length from the current frequency and the current phase shift, and may also provide the resulting data (e.g., solid angle, frequency, phase shift, intensity, cable length) to various display devices.

Thus, in a nutshell the system works as follows:

As an emitting antenna, the cable 206 is used. The transceiver 202 may be connected with an alligator clip to the cable 206. The cable 206 may be a non-shielded cable (like a power cable) or a shielded cable (like an Ethernet cable). In case of a shielded cable, the shielding is used. The shielding of the network cable ends at the related plug and has therefore no connection to any equipment like a patch panel or a server.

In order to avoid damage to the cable, the clip may have only one or two teeth (not as serrated jaw). The length of the teeth match the isolation layer of the cable, ensuring that electrical contact is made between the transceiver 202 and the shielding without perforating the shielding.

To trace the cable, the user (e.g., the technician) sets the radio transmitters 202 and 204 for a default frequency. To avoid interference with other network devices, the default frequency is not in the range of used frequencies of networks (e.g., the range of 31.25 megahertz for Ethernet). In case several users (e.g., technicians) are working simultaneously, each user may use a different frequency.

The user may then follow the cable 206 carrying the second transceiver 204. In case the measured lens of the cable 206 to be tracked increases abruptly, the user investigates possible routes of the cable 206; e.g., an orthogonal turn in another cable duct or a diversion in another floor.

In case the signal is lost, the cable ends abruptly where the cable is ruptured. The length measurement helps to determine the exact location of the rupture in the cable.

It is noted that a wide range of display devices may be used to track the cable 206. For example:

(1) A simple presentation of the signal intensity by a void meter, a lightbulb, a loudspeaker, a headphone, etc.: The usage would be similar to the usage of a metal detector. The solid angle meter is not utilized.

(2) Computer, like a laptop, a Tablet PC or a smartphone: both, the signal strength and the angular data are transferred and stored during the tracking process. In case the computer device detects its position, a 3-D map of the cable can be provided.

(3) Augmented reality glasses: in this case, the receiving antenna is installed in one or both temporal arms of the glasses. The glasses are tuned to the pre-determined frequency. As the user turns and tilts the user's head (carrying the temporal arms) the radio signal changes in strength and characteristics. The locations of the cable segments are stored and shown on the augmented reality screen as a line with a predetermined color. By checking several directions, the user can follow the cable. As soon the user encounters the end of the cable, the user ends the tracing by a predetermined movement of the head of holding the gaze for a moment at the end of the cable. The three-dimensional coordinates of the cable are stored for future use.

Figure 5:
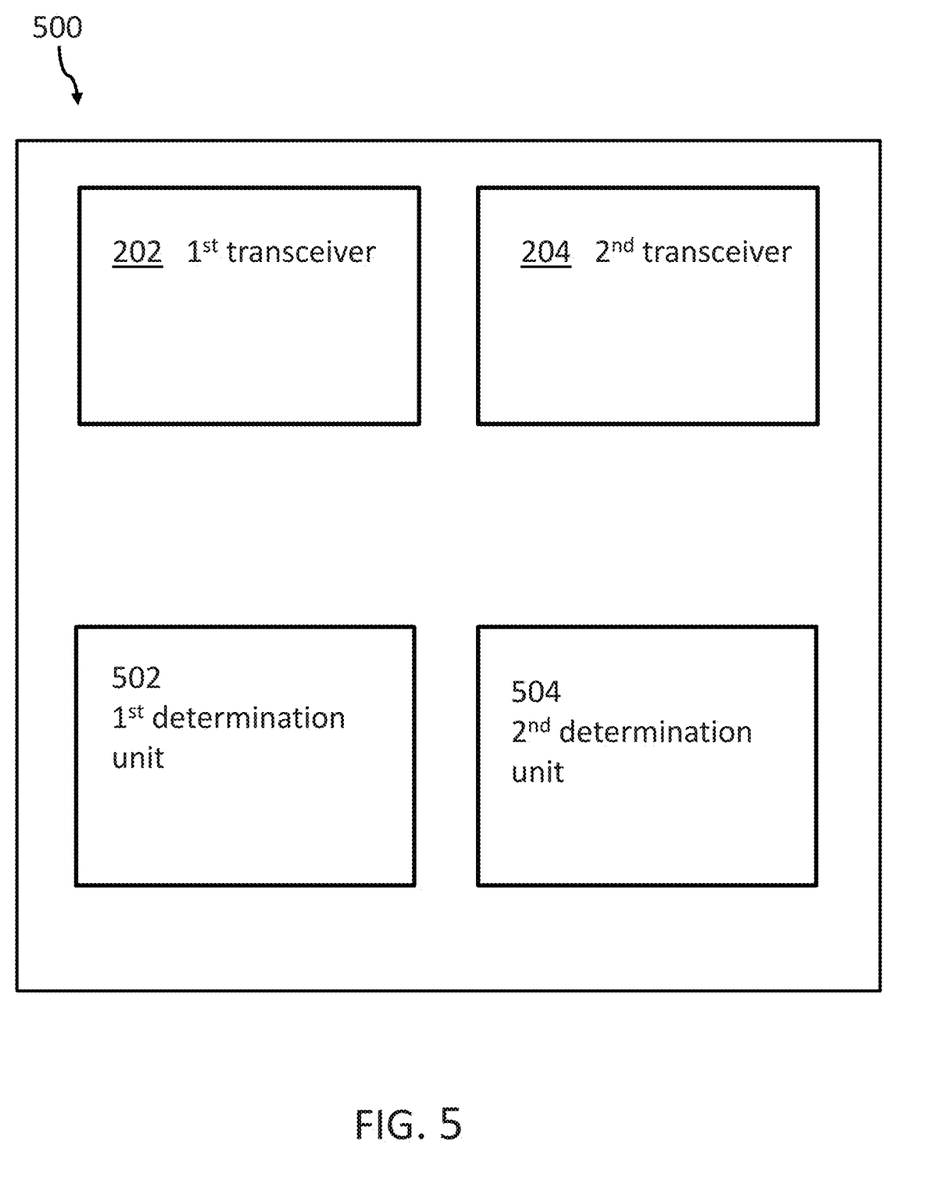
FIG. 5 shows a block diagram of a representation of a system for tracking a course of the cable using electromagnetic waves, in accordance with embodiments of the present invention.

FIG. 5 shows a block diagram of a representation of a system 500 for tracking a course of the cable using electromagnetic waves, in accordance with embodiments of the present invention. The system 500 comprises a first transceiver 202 configured for sending a first signal to a second transceiver 204 wirelessly in a linear line. The first transceiver 202 and the second transceiver 204 each comprise a receiver 408, 416 and a transmitter 406, 416. The second transceiver 204 is configured for sending first signal back to the first transceiver 202 in the linear line.

The system 500 comprises also a first determination unit 502 (combination of functional blocks of the first transceiver 202 of FIG. 4) configured for determining a first distance between the first transceiver 202 and the second transceiver 204 by determining a total transmission time for a first wireless signal travelling from the first transceiver 202 to the second transceiver 204 and back to the first transceiver 202.

The first transceiver 202 is also configured for transmitting a second signal into the cable (not shown in FIG. 5). The first signal and the second signal are phase aligned to each other. The second transceiver is also adapted for receiving the second signal wirelessly from the cable.

The system comprises also a second determination unit 504 (combination of functional blocks of the first transceiver 204 of FIG. 4) configured for determining a second distance between the first transceiver 202 and the second transceiver 204 by comparing a phase difference between the first signal received by the second transmitter 204 and the second signal received by the second transmitter 204.

FIG. 6 shows an example in which a traditional cable tracking method 600 may fail completely. A sender 602 may be connected via a cable to the cable 610 to be tracked. The cable 610 is hidden behind a wall 606. A receiver 604 receives the radiation from the cable 610. However, if the cable 610 would lie in a niche within the wall 608 or rolled up on a cable drum, the receiver 604 would not detect this radiation. Additionally, if the cable 610 were broken within the niche between the walls 608, this broken cable would also not be detectable.

Embodiments of the invention may be implemented together with virtually any type of computer (e.g., embedded to the first transceiver and/or the second transceiver) regardless of the platform being suitable for storing and/or executing program code.

Figure 7:
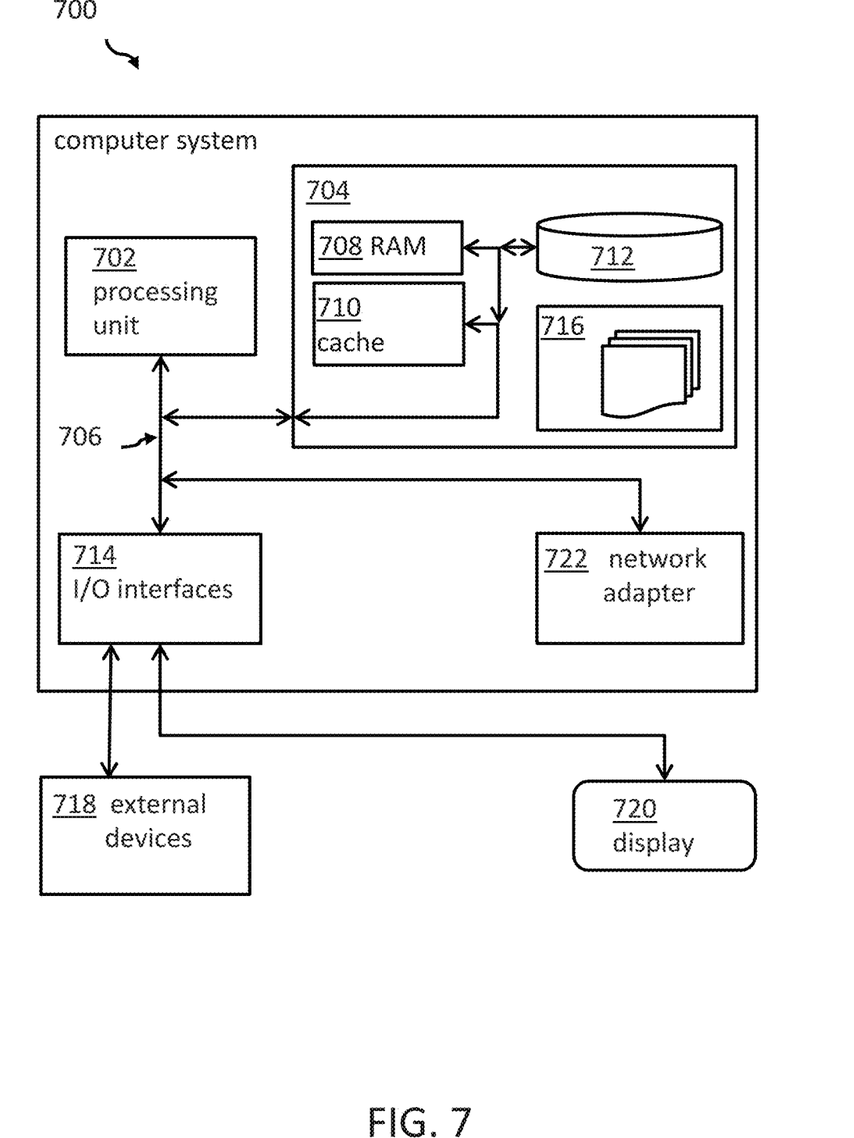
FIG. 7 shows an embodiment of a computer system configured to execute program code for implementing methods of the present invention.

FIG. 7 shows an embodiment of a computer system 700 configured to execute program code for implementing methods of the present invention.

The computer system 700 is only one example of a suitable computer system and is not intended to suggest any limitation as to the scope of use or functionality of embodiments of the invention described herein. Regardless, whether a computer system 700 is capable of being implemented and/or performing any of the functionality set forth hereinabove. In the computer system 700, there are components, which are operational with numerous other general purpose or special purpose computer system environments or configurations. Examples of well-known computer systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (ELISA) bus, Video Electronics Standards Association (VISA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computing system to implement the methods of the present invention.

A computing system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for tracking a course of a cable using electromagnetic waves, said method comprising:
   determining a first distance between a first transceiver and a second transceiver by determining a total transmission time for a first wireless signal travelling in a linear line from the first transceiver to the second transceiver and back to the first transceiver in the linear line, said first transceiver and said second transceiver each comprising a receiver and a transmitter; and
   determining a second distance between the first transceiver and the second transceiver by comparing a phase difference between the first signal received by the second transmitter and a second signal received by the second transmitter, said second signal having been transmitted from the first transceiver into the cable and received by the second transceiver wirelessly from the cable, said first signal and said second signal being phase aligned.

2. The method of claim 1, wherein said determining the first distance comprises comparing a phase shift between the sent first signal and the received first signal by the first transceiver.

3. The method of claim 1, wherein said determining the first distance comprises using a time delay caused by the second transceiver.

4. The method of claim 1, wherein the second distance equals the cable length from the first transceiver to the second transceiver.

5. The method of claim 1, wherein a distance between the second transceiver and the cable is at least 100 times smaller than the first distance between the first transceiver and the second transceiver.

6. The method of claim 1, wherein a frequency of the first signal and a frequency of the second signal are equal.

7. The method of claim 1, wherein a frequency of the first signal and a frequency of the second signal are each unequal to a desired signal on the cable.

8. The method of claim 1, wherein a frequency of the first signal and a frequency of the second signal are each in a range of 10 kHz to 100 Mhz.

9. The method of claim 1, wherein the determined first distance between the first transceiver and the second transceiver is transmitted wirelessly from the first transceiver to the second transceiver.

10. The method of claim 1, wherein the first signal passes through a solid barrier.

11. A system for tracking a course of a cable using electromagnetic waves, said system comprising:
    a first determination unit configured for determining a first distance between a first transceiver and a second transceiver by determining a total transmission time for a first wireless signal travelling in a linear line from the first transceiver to the second transceiver and back to the first transceiver in the linear line, said first transceiver configured for transmitting a second signal into the cable, said first signal and said second signal being phase aligned, said second transceiver configured for receiving the second signal wirelessly from the cable, said first transceiver and said second transceiver each comprising a receiver and a transmitter; and
    a second determination unit configured for determining a second distance between the first transceiver and the second transceiver by comparing a phase difference between the first signal received by the second transmitter and the second signal received by the second transmitter.

12. The system of claim 11, wherein the first determining unit is configured for determining the first distance by comparing a phase shift between the sent first signal and the received first signal by the first transceiver.

13. The system of claim 11, wherein the first determining unit is configured for using a time delay caused by the second transceiver.

14. The system of claim 11, wherein the second distance equals the cable length from the first transceiver to the second transceiver.

15. The system of claim 11, wherein a distance between the second transceiver and the cable is at least 100 times smaller than the first distance between the first transceiver and the second transceiver.

16. The system of claim 11, wherein a frequency of the first signal and a frequency of the second signal are equal.

17. The system of claim 11, wherein a frequency of the first signal and a frequency of the second signal are each unequal to a desired signal on said cable.

18. The system of claim 11, wherein a frequency of the first signal and a frequency of the second signal are each in a range of 10 kHz to 100 Mhz.

19. The system of claim 11, wherein the second determining unit is configured for receiving wirelessly the linear distance value between the first transceiver and the second transceiver from the first transceiver.

20. A computer program product, comprising one or more computer readable hardware storage devices having computer readable program code stored therein, said program code containing instructions executable by one or more processors of a computer system to implement a method for tracking a course of a cable using electromagnetic waves, said method comprising:
    determining a first distance between a first transceiver and a second transceiver by determining a total transmission time for a first wireless signal travelling in a linear line from the first transceiver to the second transceiver and back to the first transceiver in the linear line, said first transceiver and said second transceiver each comprising a receiver and a transmitter; and
    determining a second distance between the first transceiver and the second transceiver by comparing a phase difference between the first signal received by the second transmitter and a second signal received by the second transmitter, said second signal having been transmitted from the first transceiver into the cable and received by the second transceiver wirelessly from the cable, said first signal and said second signal being phase aligned.

* * * * *